Aug. 14, 1945.  G. TRAUTVETTER  2,382,923
VEHICLE BODY CONSTRUCTION
Original Filed Aug. 3, 1935   3 Sheets-Sheet 3
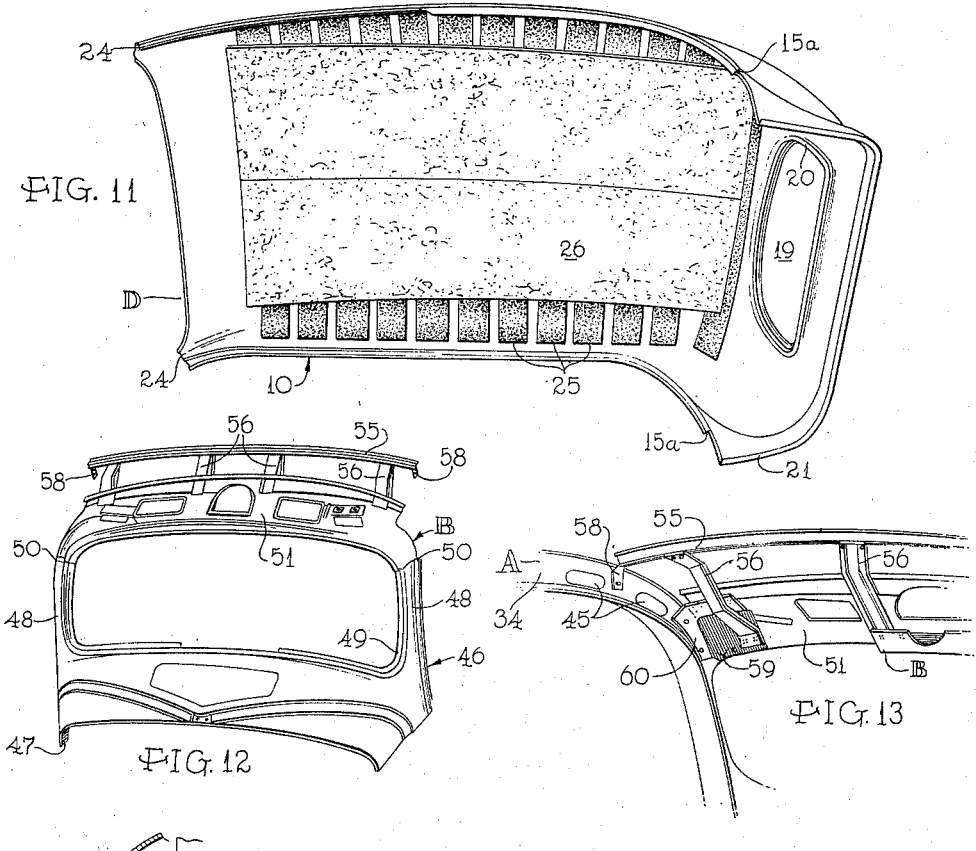
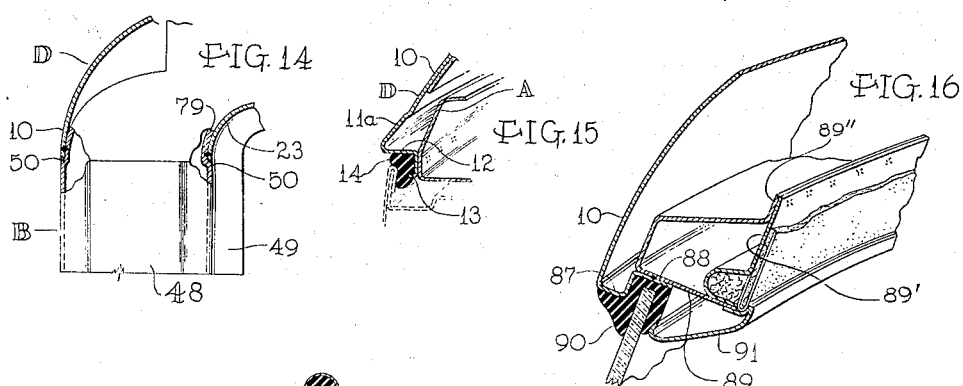
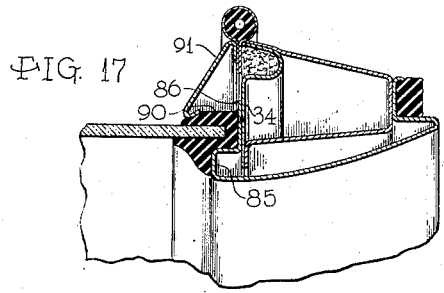
INVENTOR
George Trautvetter
BY John P. Tarbot
ATTORNEY Patented Aug. 14, 1945

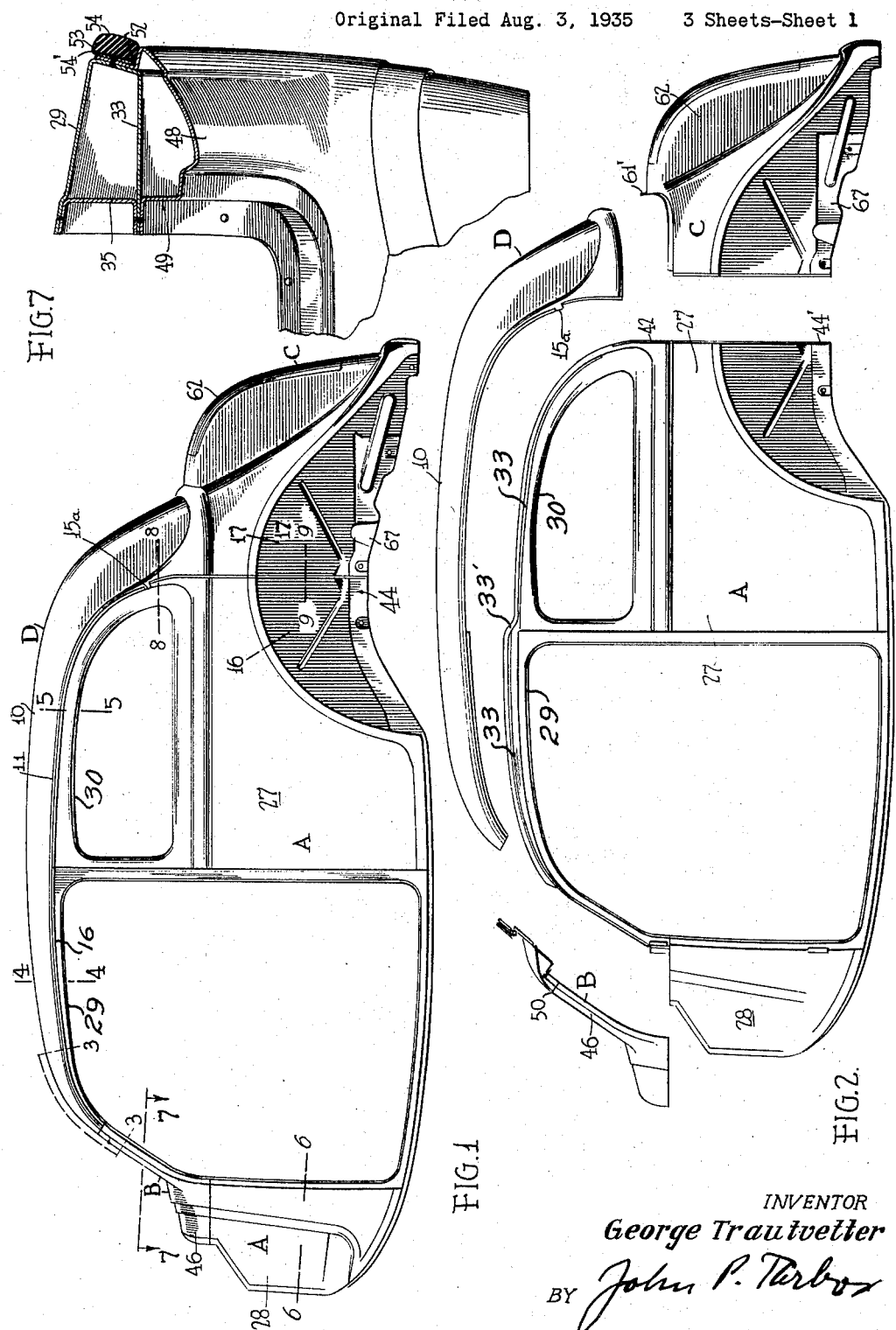

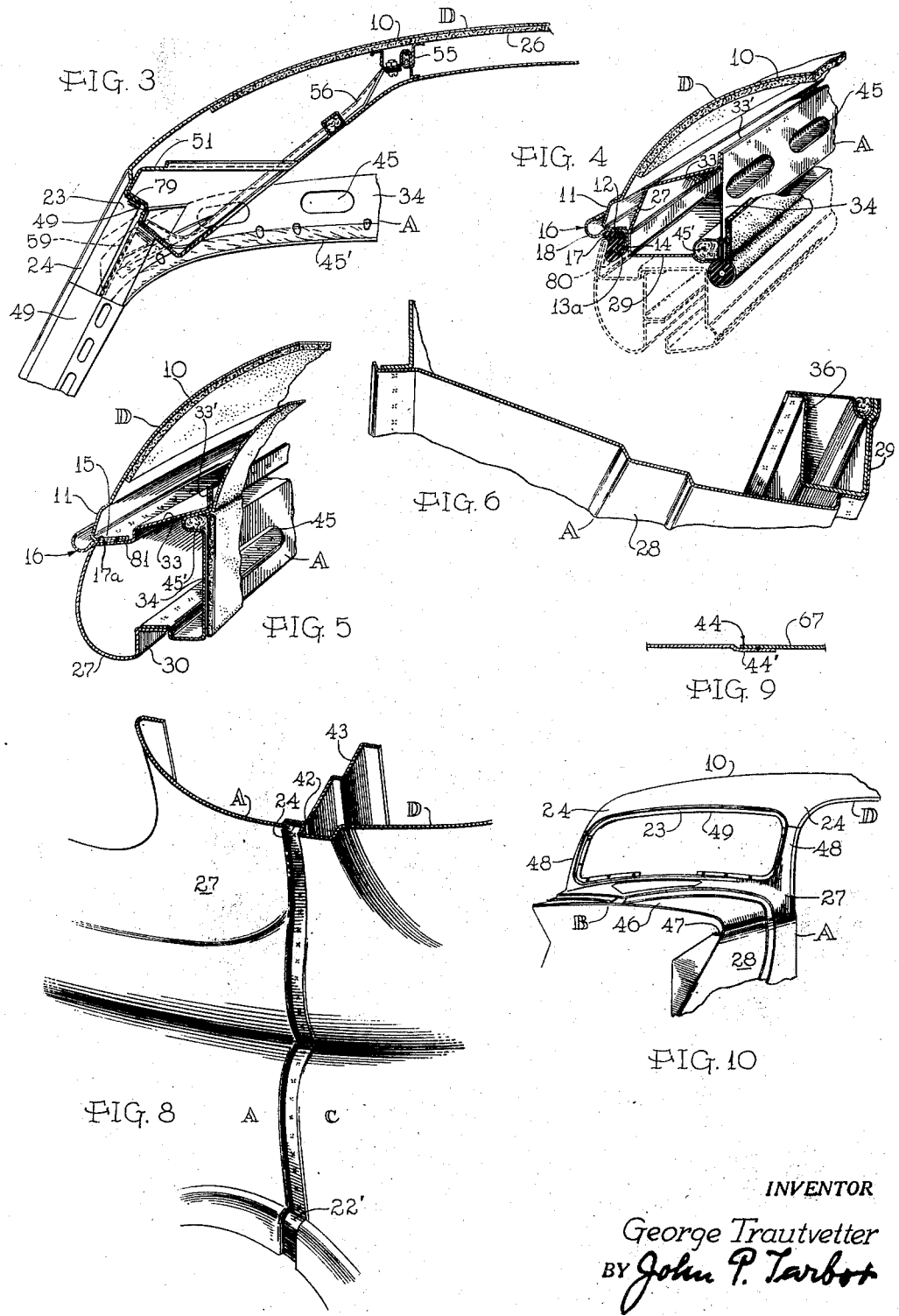

2,382,923

UNITED STATES PATENT OFFICE 2,382,923

VEHICLE BODY CONSTRUCTION

George Trautvetter, Philadelphia, Pa., assignor to Edward G. Budd Manufacturing Company, Philadelphia, Pa., a corporation of Pennsylvania Original application August 3, 1935, Serial No. 34,493. Divided and this application January 11, 1941, Serial No. 374,138

8 Claims. (Cl. 296—28)

The invention relates to sheet metal vehicle bodies and particularly to bodies of this class, the outer walls of which are fabricated of relatively few large sheet metal stampings.

It is an object of the invention to construct a body of this class in sub-assembly units which may be readily shipped in nested relation and finally assembled in regions remote from the place of manufacture of the sub-assembly units, thereby effecting a substantial saving in shipping costs.

It is another object of my invention to so form the margins of the sub-assembly units that they may be readily joined in the final assembly by readily available assembling machinery and by relatively unskilled workmen and the joints are so formed that such joinder may be effected substantially throughout by straight line spot or pinch welding in such manner that the joinder may be expedited and a minimum of finishing of the joints is required after the final assembly.

It is another object of the invention to so form the sub-assemblies as to make them self-sustaining and not liable to serious injury in shipment.

These and other objects and advantages are attained, according to a preferred form of the invention, by a roof which is formed along its lateral margins with joint formations for securing it to the tops of the side units and in its A-post portions with joint formations for securing it to a front and the side units, and by a front unit sub-assembly which comprises a unitary stamping including the top of the cowl and so much of the sides of the cowl as is not formed by the side sub-assemblies, and the upwardly extending A-post covers formed in their rear margin for securement to the A-post portions of the side sub-assemblies and in the top margins for securement to the roof and in their inner margins with formations corresponding to the formation in the front margin of the roof and with the rear margin of the top of the cowl to form the windshield framing. The tops of the A-posts portions of the front stamping are interconnected by a transversely extending windshield header to the front margin of which is secured the front margin of the roof stamping in the final assembly operation.

The invention lends itself, however, to considerable modification without substantial loss of the advantages which form the main objects thereof. Some modifications will be hereinafter described.

Other and further objects and advantages and the means whereby they are attained will become apparent from the following more detailed description when read in connection with the accompanying drawings.

In the drawings,

Fig. 1 is a side elevational view of a sedan type of body constructed in accordance with the invention.

Fig. 2 is an exploded side elevational view showing the various sub-assembly units as they appear just prior to final assembly in the completed body.

Fig. 3 is a central longitudinal vertical sectional view extending through the region indicated by the dotted line 3—3 of Fig. 1 and showing the joint between the front of the roof unit and the top of the front unit.

Fig. 4 is a fragmentary perspective view, parts being shown in section taken substantially on the line 4—4 of Fig. 1 showing the joint between the roof unit and a side unit.

Fig. 5 is a view similar to Fig. 4 taken on the line 5—5 of Fig. 1.

Fig. 6 is a fragmentary sectional view, as seen in plan, on the line 6—6 of Fig. 1.

Fig. 7 is a corresponding view on the line 7—7 of Fig. 1.

Fig. 8 is a fragmentary perspective view, parts being shown in section in the region indicated by the dotted line 8—8 of Fig. 1.

Fig. 9 is a detail sectional view on the line 9—9 of Fig. 1.

Fig. 10 is a fragmentary front perspective view of the front of the assembled body.

Fig. 11 is an underneath perspective view of the roof unit showing sound-deadening padding applied thereto.

Fig. 12 is a front perspective view of the front unit with the front roof bow attached.

Fig. 13 is a fragmentary perspective as seen from the inside showing the manner of attachment of the front and side units.

Fig. 14 is a fragmentary, part front elevation and part sectional view of the joint between the front and roof units.

Fig. 15 is a detail sectional view similar to Fig. 4 showing a slight modification of the joint between the roof unit and the side unit.

Fig. 16 is a fragmentary detail perspective view, parts being in section, showing the joints between roof and front units where the invention is applied to a fixed or vertically slidable windshield construction.

Fig. 17 is a similar view showing the joint between front and side units under similar conditions.

According to the embodiments of the invention as shown in the drawings, the completed body is fabricated in two side-sub-assemblies A, a front sub-assembly B, a rear sub-assembly C and a roof sub-assembly D.

The roof sub-assembly D in this form of the invention comprises a unitary outer panel stamping 10 extending transversely the full width of the roof and downwardly at the sides substantially to the tops of the doorway openings, its side edges above each doorway opening being formed with an outwardly projecting bead 11 or 11a, see Figs. 4 and 15, below which it is formed to provide an angular rabbet 12, the lower margin of which may be formed, as in Fig. 15, with a curved reverse bent edge flange 13 for the purpose of holding a weatherstrip 14 in the rabbet against which the edge of the door may close. Rearwardly of the door opening as indicated in Fig. 5, the bead is continued but the rabbet is not present, the edge of the roof being merely flanged inwardly as indicated at 15, and this beaded formation and flange extends downwardly at the rear side margins to the location 15a, see Figs. 1 and 11, adjacent the bottom of the rear quarter window opening, the bead there merging with a widened bead extending around the rear edge of the roof stamping.

The drip molding may be made integral with the bead 11 as shown at 11a in Fig. 15 or it may be made as a separate stamping 16 as in Fig. 4, which stamping includes the reversely curved marginal portion 13a, an angular portion 17 fitting within the rabbet 12 of the margin of the roof and secured to both arms as indicated, and an outer channel portion 18 projecting outwardly beyond the margin of the roof. This drip stamping 16 extends from the extreme front of the roof to the location 15a and in rear of the door opening as in the roof stamping, the rabbet 17 is converted into an inwardly extending flange portion 17a (see Fig. 5) of the drip channel extended to overlap the inwardly extending flange 15 of the roof stamping. Where this separate drip channel 16 is used it is preferably spot welded to the marginal portion of the roof throughout its extent and thus serves to strongly reinforce the margin of the roof sub-assembly.

At the rear the roof stamping is extended downwardly substantially to the belt line to include within its margin the rear window opening 19 in the margin of which it is flanged inwardly and rabbeted, as indicated at 20 to frame said opening and form the outer side and bottom wall of the glass run channel. The lower rear margin of the roof sub-assembly extends across the rear of the body and around the rear quarters substantially to the rear margins of the rear quarter window openings, and in its rear margin it is beaded and flanged inwardly at 21 (see Fig. 11), the bead and flange providing a stiffened margin for the sub-assembly and the flange serving as a final assembly joint.

From the point where the drip channel ends at the rear the roof stamping has its substantially vertically extending margin formed with an offset flange 22 (see Fig. 8), to stiffen its margin in this region and to form a final assembly joint.

At the front, the roof stamping is extended downwardly to form the outside face of the top windshield header and is flanged inwardly at 23 (see Fig. 3) to form a final assembly joint and part of the windshield framing. At the sides, the roof stamping is extended downwardly through short projections 24 including as parts thereof lateral and downward extensions of the flange 23, which projections are adapted to form final assembly joints with the tops of the front units as will be more particularly hereinafter pointed out.

The roof unit, being of compound curvature and flanged or otherwise reinforced throughout substantially its entire margin, provides a stiff sub-assembly structure well adapted for shipment in nested relation and by reason of its marginal construction well adapted for easy joinder in final assembly with adjoining units.

For sound-deadening purposes the roof unit may, prior to final assembly, be provided with a plurality of layers 25, 26 of suitable sound-deadening material, one of said layers, as 25, being laid transversely in spaced strips while the other layer 26 is laid longitudinally. This sound-deadening material may be secured in place to the metal panel by a suitable adhesive, and in final assembly is further pressed against the metal roof stamping, by longitudinally spaced roof bows only one of which is indicated at 55 in Fig. 3.

According to this form of the invention, the side units A are each formed as a single outer panel stamping 27 forming a side of the cowl 28 and flanged inwardly at 29 (Figs. 4 and 7), to form the frames of the doorway opening or openings and further flanged inwardly at 30 to form a frame including a rabbet to receive the rear quarter window (Fig. 5). The side unit terminates at the rear of the rear quarter window opening in a substantially vertical rear margin extending downwardly to the bottom of the body and through the wheel housing.

In the region of the cowl portions 28 the side unit is flanged to form a final assembly joint structure. In the region extending from the top of the cowl over the tops of the doorway openings and the rear quarter window openings, the side unit is flanged inwardly at 33 at the top to form with the flanges 29 at the tops of the doorway and window openings a substantially continuous inwardly-facing channel (see Figs. 4, 5 and 7). The inner edge of the flange or wall 33 is continued by a substantially vertically extending flange 33'. To further reinforce the side units in this region, these inwardly facing channels may be closed to box section over the door and window openings by inner paneling 34 spot welded to their side walls (see Figs. 4 and 5), and, in the region of the A-post (see Fig. 7) along the side of the windshield opening, by a channel section inner reinforce 35 telescoped within the channel formed by the outer panel and secured thereto by spot welding.

In the A-post region the side units may be further reinforced below the top line of the cowl in the region of the door hinge securement by inner post structures of box cross section, as indicated at 36 (see Fig. 6). At the tops these post structures may tie in directly with the channel section A-post portions shown in Fig. 7 extending along the sides of the windshield opening. Other door post portions in the side unit stampings may have similar inner reinforcements.

At the rear vertically extending margin and from the location 41 to the wheel housing the side unit stamping 27 is formed with an offset flange 42 Fig. 8 corresponding to the offset flange 22 on the roof unit and forming therewith and with the adjoining edge of the rear unit a final assembly joint. This offset if formed in the outer portion of the inwardly extending flange 43 forming a vertical continuation of the top flange 33 and providing the rear wall of the glass run channel for the rear window opening. Throughout the vertical margin of the wheel housing portion 44 thereof the rear edge of the side unit is merely offset at 44' an amount equal to the thickness of the metal to form a lapped joint with an adjoining unit. See Fig. 9.

The inner reinforcing panels 34 and 35 are preferably formed with a plurality of elongated openings 45 to afford ready access to the interior of these hollow sections in the final assembly operations. They may also be formed with channels as 45' for receiving upholstery securing strips.

The front unit sub-assembly according to this form of the invention may comprise a single stamping as seen in Fig. 12 and designated by the numeral 46 which forms the top of the cowl and the complete windshield frame extending thereabout. The cowl portion of the stamping is extended downwardly at the sides to form the upper portions of the sides of the cowl and in its lower side margins it is flanged inwardly at 47 (see Fig. 10) to form final assembly joints with the side units. The upwardly extending portions 48 at the sides of the windshield opening as well as the transversely extending upper and lower windshield headers are formed with a rabbet 49 to receive the edge of the windshield. These upwardly extending portions form the outer faces of the posts substantially to the top of the windshield opening where they are offset inwardly at 50, Figs. 13 and 14, and form an inner reinforcing top header 51 for the top of the windshield opening. The vertical rear side edges of the front unit from the lower edge to the point 50 are provided with a rabbet 52, see Fig. 7, corresponding to the rabbet 12 in the roof panel and having a reversely bent margin 53 for securing and holding in place the weatherstrip 54 similar to weatherstrip 14 at the margins of the roof unit and forming extension thereof against which the door closes. As shown in Fig. 7 this reverse bend is made in a separate strip 54' spot welded to the margin of the front stamping, although it may alternatively be made as an integral part of the front stamping as indicated in Fig. 15 in connection with the roof stamping.

The front unit may additionally comprise a flanged channel section roof bow 55 spaced from the rearwardly offset top header portion 51 of the front stamping and secured to it through a number of spaced channel sections braces 56. The ends of the channel section roof bow are formed with downwardly extending tabs 58 adapted to form final assembly joints for joinder to the side units. Similarly, the sides of the offset top header portion 51 (see Figs. 3 and 13) are provided with angular gussets, each having one arm as 59, spot welded to the transversely extending top header portion 51 and the other arm as 60 extended rearwardly and adapted to form a final assembly joint structure for attachment to the adjacent side unit.

The rear sub-assembly unit C extends from side to side around the rear quarter terminating in substantially vertical edges in the region just rearwardly of the rear quarter window opening. At the top this unit terminates at the belt and is there formed with a horizontal flange 61 terminating in an upwardly extending flange 61' extending from side to side and adapted to enter into the final assembly joint with the roof unit. This rear unit includes in the single stamping the trunk housing 62.

The sub-assembly units as so constructed are readily assembled in the final assembly by bringing together their marginal flanged edges and spot welding them together, in most cases by straight line pinch welding operations. The front unit B may be assembled with the side units by bringing the lateral flanges 47 of the cowl portion of the front stamping in overlapping relation with the laterally extending flange at the top of the cowl side portions of the side stampings and spot welding them together. The door edge receiving rabbet 52, see Fig. 7, will then be in position to overlap the outer face of the front post portion 28—33 of the side unit sub-assembly and can readily be secured thereto by spot welding. The windshield receiving rabbet 49 of the front stamping overlaps the front wall 33 of the front post of the side stamping and may be secured thereto as shown in Fig. 7 by pinch welding. At the top, as shown in Figs. 3 and 13, the arms 60 of the gussets overlap the inner panels 34 of the side units and are secured thereto by spot welding. Similarly the tabs 58 on the front roof bow 55 likewise overlap the panels 34 and are secured to the side units by spot welding. The rear unit C with the wheel housing 67 preferably pre-assembled thereto and also the floor plate, not shown, assembled to its lower edges (although this floor plate may be assembled subsequently to the assembly of the rear unit with the side units), may be assembled with the side units by bringing the front edges of the wheel housing portions thereof, see Fig. 9, in overlapping relation with the offset rear edge 44, of the side units and spot welding thereto. Above the wheel housing the joinder between the rear and side units is effected through the inwardly offset flanges 22' and 42 on the respective units which overlap in this region and are spot welded together. The shallow channel formed by the joint in this region as shown in Fig. 8, may be filled with solder flush with the outer faces of the panels to provide a continuous unbroken surface.

After the assembly of the side unit A, front unit B and rear unit C, the roof unit D is brought down into position for final assembly with the margins of the adjoining units. At the front the inwardly extending flange 23, see Figs. 3, 10 and 13, overlaps the inwardly extending wall 79 of the rabbeted portion 49 of the inwardly offset top header portion of the front unitary stamping and is secured thereto by spot welding. As clearly shown in Fig. 13, the upper portions of the post cover and side windshield frame portions of the front stamping are formed with an offset at 50 equal in depth to the thickness of the roof panel and the roof panel and the lateral downward extensions 23, 24 from the roof panel fit into this offset flush with the outer face of the front stamping therebelow and are spot or otherwise welded thereto to form a flush joint between the outer face of the roof and the outer face of the front stamping, as clearly appears from Figs. 3, 10 and 13.

The lateral margins of the roof stamping throughout the regions of the doorway openings extend downwardly to the doorway openings as shown in Figs. 4 and 11, and their rabbeted margins 12 receiving the edge of the door indicated in dotted lines at 80 are secured by a line of spot welds to the outer face of the channel section rail 33, 29 formed in the side unit stamping above the doorway openings. Ready access is had for this welding operation through the openings 45 provided in the inner panel 34. Rearwardly of the door openings the inwardly extending flanges 15 in the margin of the roof overlap the downwardly offset seat 31, see Fig. 5, formed in the inwardly extending top flange 33 of the side units and are secured thereto by a line of spot welds as is clearly shown in Fig. 5, this joint extending rearwardly and downwardly to the location 15a (Figs. 1, 2 and 11) adjacent the lower edge of the rear quarter window opening. From there on downwardly the roof and side units are joined through the inwardly offset overlap flange portions 22, 42 shown in Fig. 8, which joint is finally made flush with the outer face of the paneling by filling the shallow channel formed at the joint by solder.

Figure 2 and a comparison of Figures 4 and 5 reveal that the header formed above the rear quarter window opening by the outer panel 27, the flanges 30, 33 and the inner panel 34 is downwardly offset at 33' with respect to the header formed above the door opening by the outer panel 27, its flanges 29, 33 and the inner panel 34. The inwardly extending portion of the roof flange 12 above the door opening is, on the other hand, continued without being offset by the inwardly extending roof flange 15 above the rear quarter window opening so that the drip channel 16 may be arranged in a continuous, smooth arch. This arrangement has the advantage that the cross sectional areas of the header in the door and in the window region are of similar magnitude, and that the flange 30 defining the rear quarter window is arranged substantially in a continuous line with the inwardly extending portion of the outer door panel defining the upper margin of the door window opening. This arrangement has the further advantage that the roof panel may be fastened, such as by welding, to the outside of the header in the region of the door where the welds or the like are covered by the marginal flange of the door. In the region of the rear quarter window, however, the roof rests on the top of the header so that the weld, which cannot be covered up by the door, is not visible but located in the interior of the body. The rear lower marginal flange 21 of the roof stamping overlaps the horizontal portion at the upper margin of the rear unit C just rearwardly of the upwardly extending marginal flange 61' in its top margin and is secured thereto by a line of spot welds extending all the way from a position adjacent the rear of one rear quarter window around the back and forwardly to a position adjacent the other rear quarter window.

Where a fixed or vertically sliding windshield is desired, the margins of the front and roof units may be formed as shown in the sectional views of Figs. 16 and 17. In these views the front unit is shown as provided with an inwardly extending molding 85 forming the outer wall of the glass run and the garnish around the outside of the windshield at the sides and bottom of the windshield opening, the inner side wall of this molding being extended by flange 86 and secured to the inner panel 34 of the box section post forming a part of the side unit. Similarly the roof unit is extended down by a bead 87 as shown in Fig. 16 forming the outer side wall of the glass receiving channel and the garnish for the windshield opening at the top. This bead 87 is likewise extended in by a flange 88 which flange is secured by spot welding to the top inside header 89 forming a part of the front stamping. In this form of the invention the top header is shown of somewhat different cross section from that disclosed in the form shown in Figs. 3 and 13, but its function is substantially the same as in those figures. The header 89 is an inwardly facing channel the mouth of which is closed by a member 89' and which is provided along its upper inner margin with a substantially vertically extending flange 89''; the construction of the header is substantially the same as that of the side header 29, 33, 33', 34 illustrated in Figures 4 and 5. In these Figs. 16 and 17 the edge of the windshield is shown received in channel section rubber weatherstrips 90 which are held in place by an inner molding strip 91.

In all of the foregoing modifications the main objects of the invention are achieved, namely, the fabrication of the outer paneling of a body in relatively few main stampings which are of a form to permit their ready nesting in shipment and which can be assembled at various final assembly locations by simple spot welding operations. Most of the final assembly joints are hidden and effected by simple line welding operations with a pair of pinch welders. The construction is a highly practical one and one which lends itself readily to quantity production of the units at a main production plant and their shipment to various final assembling plants and easy final assembly at those plants. The construction is one which lends itself to extensive variation in the various types of bodies and under various shop conditions and in the following claims it is intended to cover all such variations as readily fall within the purview of those skilled in the art.

The present application is a division of prior application Vehicle body construction and method of fabrication, Serial No. 34,493, filed August 3, 1935, of the same inventor, on which Patent No. 2,256,837 issued on September 23, 1941. Application, Serial No. 497,763, filed August 7, 1943, for "Vehicle body construction," is a division of the present application.

What is claimed is:

1. In a vehicle body, a unitary front wall stamping extending entirely around the windshield opening framing said opening and forming the outer face of said framing and the front face facing at the sides of the windshield opening but offset inwardly adjacent the top of said opening to form the inner portions of the side combined windshield framing and posts and the top header of the windshield framing, said offset being inwardly of the outer face of the lower portion of the windshield side framing and post facing, a roof panel having its forward portion downwardly extended and conforming in transverse extent to the extent of said offset portion and secured in the margins of said offset in the side portions and in the margin of the top header to form the outer face of the upper portion of the windshield framing and post facing.

2. A vehicle body construction comprising a side wall member and a separately manufactured arched transverse sheet metal panel unit such as a roof unit extending from side to side of the body and at one side downwardly substantially to a doorway opening provided in said side wall member, the lateral margin of said panel unit above a doorway opening being inwardly offset so as to constitute an angle-section flange, said offset margin being adapted to receive the edge of a door to be fitted into said opening, a drip channel member having an inwardly extending portion overlapping and being fastened to said offset margin, said offset margin overlapping and being directly fastened to the outer face of said side wall member so as to form part of a final assembly joint formation between said panel unit and said side wall member.

3. A vehicle body construction comprising a side header extending over the door and window openings in the side of the body and a roof panel unit coming down over the outside of the side header in the region of the doorway opening and secured to the side header immediately above the door opening through a rabbeted marginal portion, said rabbeted portion being provided on said roof unit and being adapted to receive the edge of the door, said roof panel in the region over the rear quarter window opening being formed with an inwardly extending flange overlapping the top of the header and secured thereto, the portion of said header including its top in the region above the window opening being downwardly offset with respect to the header portion above the adjacent doorway opening.

4. A vehicle body construction comprising a side header extending over the door and window openings in the side of the body and a roof panel unit coming down over the outside of the side header in the region of the doorway opening and secured to the side header immediately above the door opening through a rabbeted marginal portion, said rabbeted portion being formed on said roof panel unit and being adapted to receive the edge of the door, said roof panel in the region over the rear quarter window opening being formed with an inwardly extending flange overlapping the top of the header and secured thereto, the portion of said header in the region above the window opening being downwardly offset with respect to the header portion above the adjacent doorway opening, the outer surface of said header forming in the region of said window the outer surface of the body side wall and being formed similar in form and height to the outer panel above a window of a door to be fitted into said door opening.

5. The combination with a vehicle body including a front section, having a window opening defined by a cowl, pillars and a top frame, the top frame extending inwardly from the terminal top edge of the pillars, and a roof panel having the contour of the top frame and provided with projecting pillar portion which extend downwardly below the top edge of said window opening which engage the top edge of the pillar about the frame to form a unit construction, said frame, the top edge of the pillars and the edge of the mating portion of the roof panel being flanged and secured together by said flanges.

6. In a front end construction for a vehicle body, a windshield framing finish panel extending completely around and defining a windshield opening, said windshield framing panel having an arcuately curved top marginal edge provided with a rearwardly projecting flange, a top panel having a rearwardly projecting flange on the forward marginal edge thereof and adapted to mate with the flange at the top of said windshield opening and provided with projecting pillar portions extending downwardly at the sides of the windshield opening, pillar members extending upwardly at the sides of said windshield opening adapted to mate with said windshield framing panel and with the outboard side of said projecting pillar portions of said top panel, said members being secured together through said mating flanges to provide a unitary construction.

7. A unitary front wall stamping for a vehicle body, said stamping extending entirely around the windshield opening and forming the outer face of the front wall along the lower and lateral sides of the windshield opening whereas its header portion along the top of the windshield opening is adapted to be covered by the forward portion of a roof and to form an inner reinforcement therefor, said header portion being inwardly and rearwardly offset from the outer surface of the body in the same region.

8. In a vehicle body, a unitary front wall stamping extending entirely around the windshield opening, the portion of said stamping along the sides of the window opening being of channel cross section with the mouth of the channel facing rearwardly so as to form the windshield framing and the outer surface of the front body posts in the region of the windshield opening, a transverse header portion of the stamping being rearwardly offset beginning at a line near the upper corners of the windshield opening, said header portion carrying by means of rearwardly extending spacer members a separate roof bow, said header member and said roof bow being adapted to be covered by and connected to the forward marginal portion of a roof stamping.

GEORGE TRAUTVETTER.